Jan. 29, 1929.
C. W. WHITE
1,700,459
SPRING FOR JUVENILE VEHICLES
Filed Aug. 6, 1927
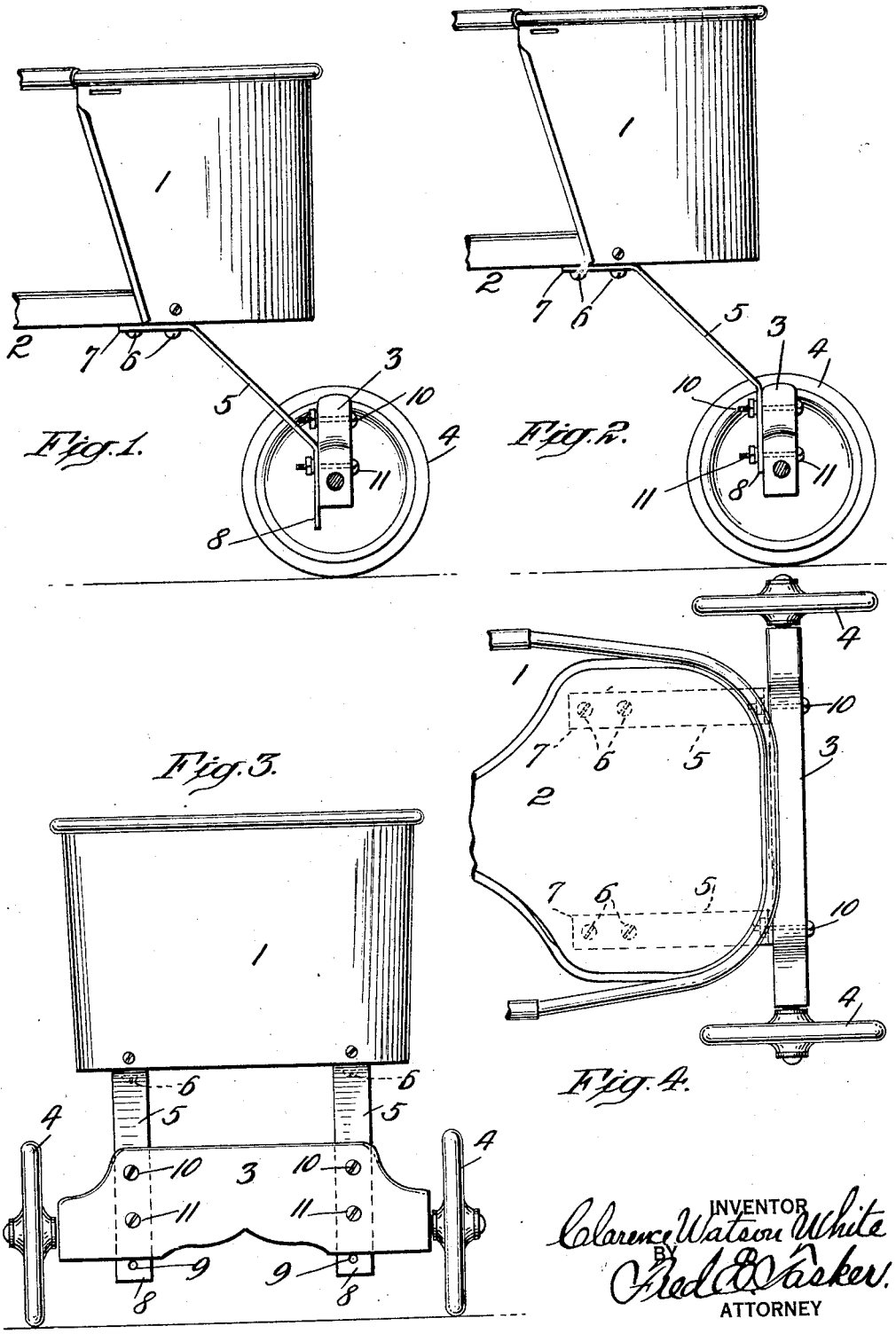
INVENTOR
Clarence Watson White
BY
Fred E. Tasker
ATTORNEY Patented Jan. 29, 1929.

1,700,459

UNITED STATES PATENT OFFICE.

CLARENCE WATSON WHITE, OF NORTH BENNINGTON, VERMONT, ASSIGNOR TO H. C. WHITE COMPANY, OF NORTH BENNINGTON, VERMONT, A CORPORATION OF VERMONT.

SPRING FOR JUVENILE VEHICLES.

Application filed August 6, 1927. Serial No. 211,221.

My present invention refers to a spring for use with a child's vehicle, such as carts or cars for small children, like play cars, stroller cars, baby walkers, and the like.

The main object had in view in the present improvements is to provide means for adjusting the car to different heights, particularly the rear or seat end, so as to adapt the same to children of varying sizes and ages, in order that the distance of the seat from the ground may be varied as required, this being especially important in children's vehicles adapted to be propelled by the feet of the child who straddles the frame.

With this main object in view, besides others, the invention may be said to consist essentially in a spring or springs, flat, curved, or otherwise, secured to the vehicle and also to the rear bolster, the attachment to the rear bolster being adjustable by the use of bolts and a series of bolt holes so that the vehicle seat may be placed at a convenient and variable height from the ground for the child using it, which height may be changed within certain limits above and below with ease and facility.

And the invention also consists in the construction, combination, and arrangement of parts, and in numerous details and peculiarities of the same, substantially as will be hereinafter described and claimed.

In the annexed drawing illustrating my invention:

Figure 1 is a partial side view of a child's vehicle and its rear bolster and other rear parts, with my improved adjustable springs applied thereto, the springs being here shown in the lowest position of adjustment.

Figure 2 is a similar side view, showing the springs in the highest adjustable position.

Figure 3 is a rear end elevation of the same parts represented in Figure 1.

Figure 4 is a top plan view.

Like characters of reference denote like parts throughout the different figures.

The main body of the vehicle, as preferably constructed, is similar in respect to the seat portion to that shown in my former Letters-Patent for child's toy vehicle, dated March 20, 1917, No. 1,220,038, wherein the horizontal body member 2 comprises a relatively broad rear seat portion and a relatively narrow or reduced forwardly-projecting portion, in longitudinal continuation of the seat proper, said narrow portion being adapted to be straddled by and support a small child when in a walking position. On the rear seat portion proper and secured to and extending vertically upwardly therefrom is a member 1 forming a back and sides for the seat, and being curved around to partly enclose the body of the child. This back piece may be equipped with a baby confining rod or guard, only partly shown, when the device is in use as a baby walker.

This vehicle may be of any suitable kind, such as are commonly referred to as play cars, strollers, baby tenders, baby walkers, and the like. My improved spring is adapted for use with a large variety, and I am confined to no particular kind.

I have not thought it necessary to show the front wheels and bolster, as springs are not generally used at the front. And it will be obvious that the front may have a common single-swiveled or caster mounted wheel or a pair of them, arranged in connection with a bolster which can be of any size and can raise the front of the vehicle to any height. But I have shown the rear bolster 3 and the fixed wheels 4, 4, at the ends thereof. My improved spring 5 may be a single spring, or there may be two duplicates. The spring may be of a cantilever type, or of an elliptical type, or otherwise. Each spring 5 has a top horizontal portion 7, an inclined portion and a vertical portion 8, all three parts being integral and suitably bent out of a single piece of steel. The top horizontal portion 7 is secured by screws or bolts 6 to the under side of seat 2. The vertical portion 8 is secured to bolster 3 by two bolts 10 and 11 when seat 2 is in its highest position, as in Figure 2, or by one bolt only, as 11, when seat 2 is in its lowest position, as in Figure 1, the portion 8 having two bolt holes and the bolster 3 having also two bolt holes which are coincident with the holes in the portion 8 when the seat is to occupy its highest position and both bolts 10 and 11 are employed. These holes in the portion 8 and the bolster 3 permit the different adjustments.

When the seat 2 is set low, the spring is arranged so that the vertical portion 8 is low, and its lower hole 9 is not then in use, which is indicated in Figures 1 and 3. When, however, the seat is set higher, then the lower hole 9 and the lower hole in bolster 3 are occupied by bolt 11, and the upper hole in bolster 3 and the upper hole in portion 8 are occupied by bolt 10 as in Figure 2.

The two springs are exact duplicates and work in precisely the same manner, and they give an effective flexible support to the car body. The important feature of my invention is a yielding adjustable support for the car body, and the yielding effect may obviously be produced by a spring of the flat cantilever type, or of any other type, as for example the elliptical type. A cantilever spring of this kind by throwing the weight over some distance beyond the bolster, so that the weight is carried on the inclined yielding cantilever arm, furnishes an excellent elastic support for the carriage or vehicle and has been found very successful in practice.

What I claim, is:

In a child's vehicle having a seat with a relatively broad rear portion and a relatively narrow forward-projecting portion, said narrow portion being adapted to be straddled by and support a small child when in a walking position, and having also a vertical member secured to and extending upwardly on the rear seat portion to form a back and sides for the seat and being curved around to partly enclose the body of the child, the combination with the seat and a perforated bolster below it, of a cantilever spring having a horizontal portion secured to the seat, a perforated vertical portion whose perforations coincide with those in the bolster, and an integral inclined portion between the horizontal and vertical portions, together with bolts for use in the perforations in the spring and bolster, so that the spring may be adjusted in height in its relation to the bolster and the underlying surface on which the vehicle travels and which is engaged by the feet of the child when in walking position straddling the seat.

In testimony whereof I hereunto affix my signature.

CLARENCE WATSON WHITE.